(12) United States Patent
Sala et al.

(10) Patent No.: US 8,844,191 B2
(45) Date of Patent: Sep. 30, 2014

(54) COMPOSITE TERMITE BARRIER

(75) Inventors: Tonio Umberto Sala, Malaga (AU);
Clive Roy Denis Cumming, Malaga (AU); Geoffrey Wayne Richardson, Malaga (AU)

(73) Assignee: TMA Corporation Pty Ltd, Malaga, Western Australia (AU)

( * ) Notice: Subject to any disclaimer, the term of this patent is extended or adjusted under 35 U.S.C. 154(b) by 465 days.

(21) Appl. No.: 13/262,377

(22) PCT Filed: Mar. 25, 2010

(86) PCT No.: PCT/AU2010/000347
§ 371 (c)(1),
(2), (4) Date: Nov. 11, 2011

(87) PCT Pub. No.: WO2010/111732
PCT Pub. Date: Oct. 7, 2010

(65) Prior Publication Data
US 2012/0047792 A1    Mar. 1, 2012

(30) Foreign Application Priority Data

Mar. 30, 2009 (AU) ............................... 2009901373

(51) Int. Cl.
*A01K 85/00* (2006.01)
*E04B 1/72* (2006.01)
*A01M 29/34* (2011.01)

(52) U.S. Cl.
CPC . *E04B 1/72* (2013.01); *A01M 29/34* (2013.01)
USPC ............................................ 43/42.24; 43/42

(58) Field of Classification Search
USPC .................................. 43/42.24, 42
See application file for complete search history.

(56) References Cited

U.S. PATENT DOCUMENTS

| | | | | |
|---|---|---|---|---|
| 2,315,772 A | * | 4/1943 | Closs | 43/131 |
| 2,899,771 A | * | 8/1959 | Burris, Jr. | 52/169.14 |
| 2,952,938 A | * | 9/1960 | Abrams | 52/517 |
| 3,931,692 A | * | 1/1976 | Hermanson | 43/131 |
| 4,103,450 A | * | 8/1978 | Whitcomb | 43/131 |
| 5,224,288 A | * | 7/1993 | Skelton et al. | 43/131 |
| 5,417,017 A | | 5/1995 | Toutountzis | |
| 5,802,779 A | * | 9/1998 | Hulls et al. | 52/101 |
| 5,860,266 A | * | 1/1999 | Martinet et al. | 52/741.3 |
| 5,927,024 A | | 7/1999 | Toutountzis et al. | |
| 5,950,356 A | * | 9/1999 | Nimocks | 43/131 |

(Continued)

FOREIGN PATENT DOCUMENTS

| | | |
|---|---|---|
| AU | 2003244546 A1 | 3/2004 |
| JP | 62-166201 | 10/1987 |

(Continued)

*Primary Examiner* — Christopher P Ellis
(74) *Attorney, Agent, or Firm* — Shewchuk IP Services, LLC; Jeffrey D. Shewchuk

(57) ABSTRACT

A composite pest barrier (10) comprising mesh sheeting (13) and a pest deterrent associated with the mesh sheeting. The mesh sheeting (13) typically comprises woven mesh sheeting. The pest deterrent comprises a pest resistant material. The pest deterrent may be associated with the mesh sheeting (13) in any suitable way. In one arrangement, the pest deterrent comprises a membrane (15) applied to the mesh sheeting, the membrane (15) carrying pest resistant material. In another arrangement, the pest deterrent comprises pest resistant material applied to the mesh sheeting (15). In yet another arrangement, the pest deterrent is incorporated into the mesh sheeting (15) itself.

27 Claims, 6 Drawing Sheets

(56) References Cited

U.S. PATENT DOCUMENTS

| | | |
|---|---|---|
| 6,182,412 B1 * | 2/2001 | Traxler .......................... 52/517 |
| 6,803,051 B1 | 10/2004 | Voris et al. |
| RE39,223 E | 8/2006 | Toutountzis |
| 8,372,418 B2 * | 2/2013 | Dujardin et al. ............. 424/411 |
| 2008/0115406 A1 * | 5/2008 | Duston et al. ................... 43/131 |
| 2012/0055076 A1 * | 3/2012 | Smith et al. ..................... 43/131 |

FOREIGN PATENT DOCUMENTS

| | | |
|---|---|---|
| JP | 63-145802 | 9/1988 |
| JP | 2000093067 A | 4/2000 |
| JP | 2005021023 A | 1/2005 |
| WO | 90/14004 A1 | 11/1990 |
| WO | 97/47190 A1 | 12/1997 |
| WO | 02/43487 A2 | 6/2002 |
| WO | 03/90532 A1 | 11/2003 |

\* cited by examiner

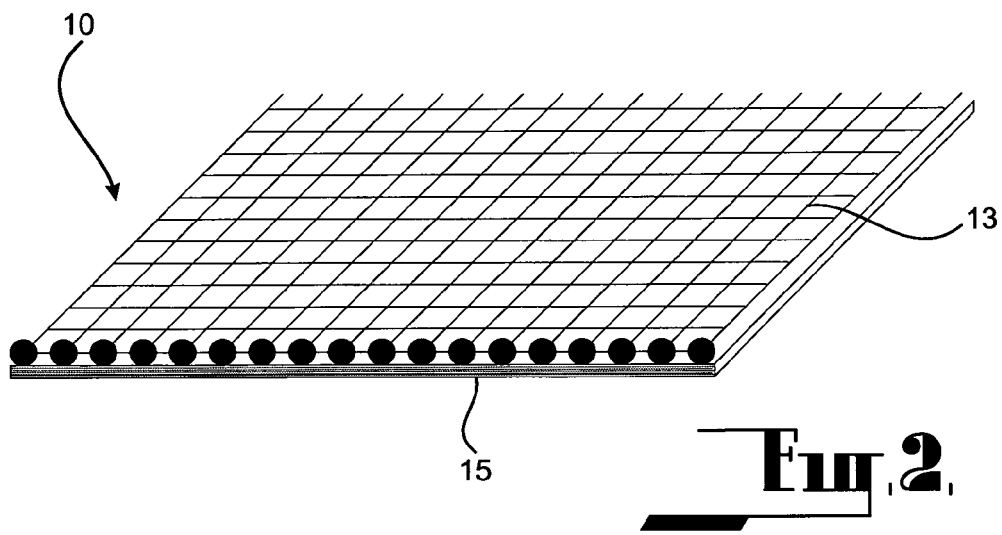
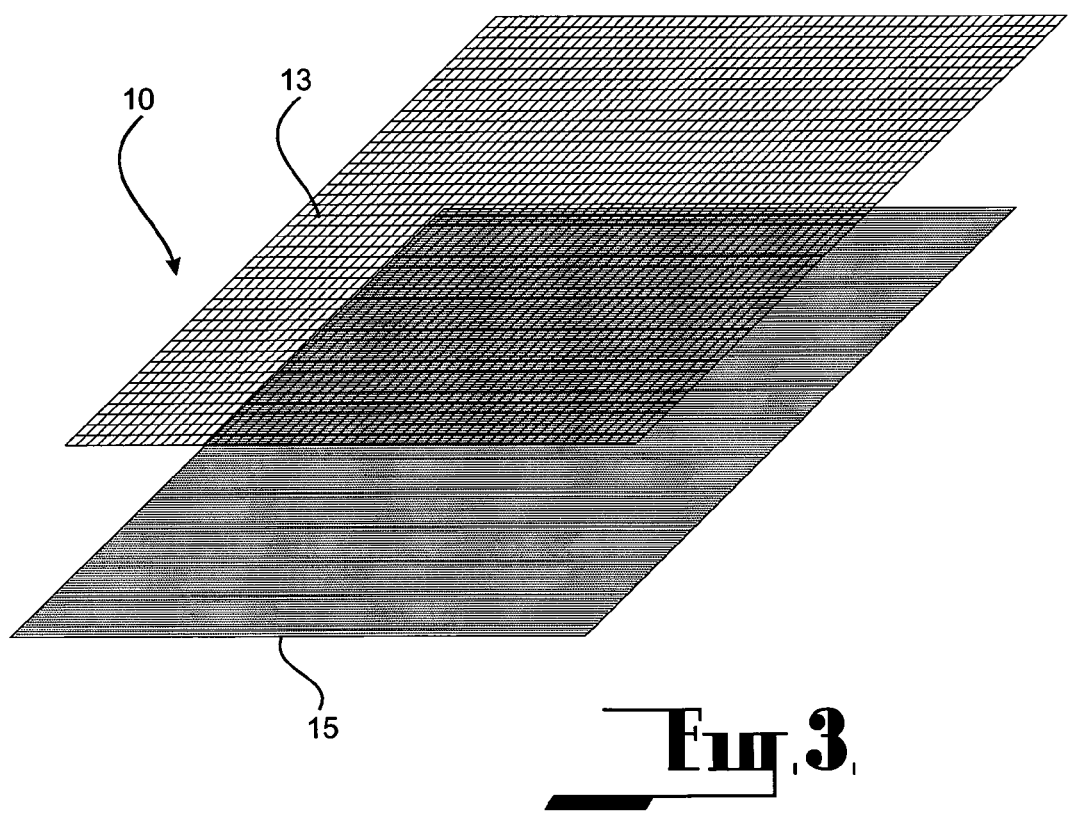

COMPOSITE TERMITE BARRIER

FIELD OF THE INVENTION

The present invention relates to pest control and more particularly to a composite pest barrier, and to protection of buildings and other structures from such pests.

While the pest barrier according to invention has been devised particularly as a termite barrier, it can also function as a barrier for other pests, particularly crawling pests including spiders and insects such as ants.

BACKGROUND ART

The following discussion of the background art is intended to facilitate an understanding of the present invention only. The discussion is not an acknowledgement or admission that any of the material referred to is or was part of the common general knowledge as at the priority date of the application.

There are various proposals for barriers to prevent or inhibit infestation of buildings and other structures by termites. Typically, the barriers comprise either chemical barriers or physical barriers.

Chemical barriers have been used for many years, although in recent times there has been a trend towards physical barriers, owing to health concerns arising from the use of certain chemicals to establish chemical barriers. Among other things, the concerns relate to the manner in which the chemicals are delivered for the purposes of establishing the chemical barrier, typically by way of pouring, spraying or injecting insecticides in doses sufficient to provide protection for an extended duration.

With a view to addressing concerns about the delivery of chemicals in the establishment of chemical barriers, there have been proposals for the chemicals to be incorporated into membranes and other arrangements which are laid into position, thereby avoiding the need for spraying, pouring or injecting chemicals. Physical barriers can be in various forms, including stainless steel mesh and graded stone. Stainless steel mesh barriers have proved to be particularly effective; however, cost can be an issue of concern in certain applications.

It is against this background and the problems and difficulties associated therewith, that the present invention has been developed.

DISCLOSURE OF THE INVENTION

According to a first aspect of the invention there is provided a composite pest barrier comprising mesh sheeting and a pest deterrent associated with the mesh sheeting.

Preferably, the mesh sheeting comprises woven mesh sheeting. However, it may take any other suitable form, including for example sheeting having perforations to provide a mesh construction.

The mesh sheeting may be formed of any appropriate material or materials, such as for example a metal, a plastics material, a fabric material or a combination thereof.

The pest deterrent may comprise a pest resistant material. The pest resistant material may comprise a pest repellent and/or a pesticide; more particularly, the pest resistant material may comprise a termiticide in the case of termite control.

The pest deterrent may be associated with the mesh in any suitable way. Various arrangements in which the pest deterrent can be associated with the mesh sheeting are outlined below.

In one arrangement, the pest deterrent may comprise a membrane applied to the mesh sheeting, the membrane carrying pest resistant material. The membrane may comprise plastic sheeting. The membrane may carry the pest resistant material by being impregnated with the pest resistant material and/or by having the pest resistant material applied to it.

There may be two such membranes, one applied to each side of the mesh sheeting.

Alternatively, there may be two membranes on opposed sides of the mesh sheeting, one carrying pest resistant material and the other functioning to shield a person handling the composite pest barrier from direct contact with the pest deterrent within the barrier.

In another arrangement, the pest deterrent may comprise pest resistant material applied to the mesh. With this arrangement, the pest resistant material may be impregnated in a coating applied to the mesh. The coating may be applied to the mesh in any suitable way. The coating may, for example, be applied by laminating it onto one side of the mesh or painting it onto the mesh. Where the mesh comprises woven strands, the coating may be applied to the stands. The strands may be coated prior to, or after, being woven to form the mesh.

The coating may be of any suitable material. The coating may, for example, comprise a plastics material including thermoplastic materials such as polyethylene and polypropylene, as well as certain nylons and polyolefins. The coating may also be of certain thermosetting plastics materials such as polyurethanes and certain polyesters. The coating may also comprise a foam plastics material. Further, the coating may comprise a metallic coating.

The coating may be applied as a powder coating.

In yet another arrangement, the pest deterrent may be incorporated into the mesh sheeting itself; for example, the pest deterrent may comprise pest resistant material impregnated into the mesh sheeting, particularly in cases where the mesh sheeting is of a plastics material. The pest resistant material may be impregnated into all of the mesh sheeting or portions thereof. Where the mesh sheeting is formed of a plastics material, the pest resistant material may be impregnated into the plastics material.

A protective membrane may be applied to one side of the mesh sheeting. The membrane in such an arrangement may be provided for the purpose of allowing a person handling the composite pest barrier to avoid contact with the mesh sheeting incorporating the pest deterrent. Specifically, the protective membrane would serve to shield the person handling the composite pest barrier from direct contact with the pest deterrent. Accordingly, the protective membrane would typically would not contain any pest deterrent or at least any pest deterrent present would be at a level deemed to be safe for handling purposes.

There may be two such protective membranes, one applied to each side of the mesh sheeting.

Alternatively, there may be two membranes on opposed sides of the mesh sheeting, one carrying pest resistant material and the other being a protective membrane functioning to shield the person handling the composite pest barrier from direct contact with the pest deterrent within the barrier.

According to a second aspect of the invention there is provided a composite pest barrier comprising mesh sheeting and a membrane applied to one side of the mesh sheeting, the membrane carrying pest resistant material.

The composite pest barrier according to the second aspect of the invention may further comprise a further membrane applied to the other side of the mesh sheeting. The further membrane preferably also carries pest resistant material.

According to a third aspect of the invention there is provided a composite pest barrier comprising mesh sheeting, the mesh sheeting comprising material impregnated with a termite deterrent. Preferably, the mesh sheeting comprises plastics material.

According to a fourth aspect of the invention there is provided a composite pest barrier comprising mesh sheeting, and a pest deterrent applied as a coating to the mesh sheeting. The pest deterrent may be impregnated with a pest resistant material.

According to a fifth aspect of the invention there is provided a composite pest barrier comprising mesh sheeting, the mesh sheeting comprising strands, and a pest deterrent applied to the strands. The pest deterrent may be applied to the stands as a coating impregnated with a pest resistant material.

According to a sixth aspect of the invention there is provided a composite termite barrier comprising mesh sheeting and a pest deterrent associated with the mesh sheeting, the pest deterrent comprising a termiticide.

According to a seventh aspect of the invention there is provided a composite pest barrier comprising mesh sheeting and a membrane applied to one side of the mesh sheeting, the membrane functioning to shield a person handling the composite pest barrier from direct contact with pest deterrent within the barrier.

According to an eighth aspect of the invention there is provided a composite pest barrier of laminated construction comprising a pest deterrent interposed between two layers of mesh sheeting.

The pest deterrent may be associated with an inner layer disposed between the two layers of mesh sheeting. The inner layer may comprise a membrane impregnated with the pest deterrent. The membrane may comprise a fibre blanket.

BRIEF DESCRIPTION OF THE DRAWINGS

The invention will be better understood by reference to the following description of various specific embodiments thereof as shown in the accompanying illustrations, in which:

FIG. 2 is fragmentary schematic perspective view, on an enlarged scale, of the composite barrier according to the first embodiment;

FIG. 3 is an exploded perspective view of the composite barrier according to the first embodiment;

BEST MODE(S) FOR CARRYING OUT THE INVENTION

The embodiments are directed to termite barriers for the protection of buildings and other structures from termites.

The termite barriers according to the embodiments can be installed in buildings and other structures in any appropriate way, some typical examples of which include installations described and illustrated in Australian Patents 639256 and 696436.

Figure 1:
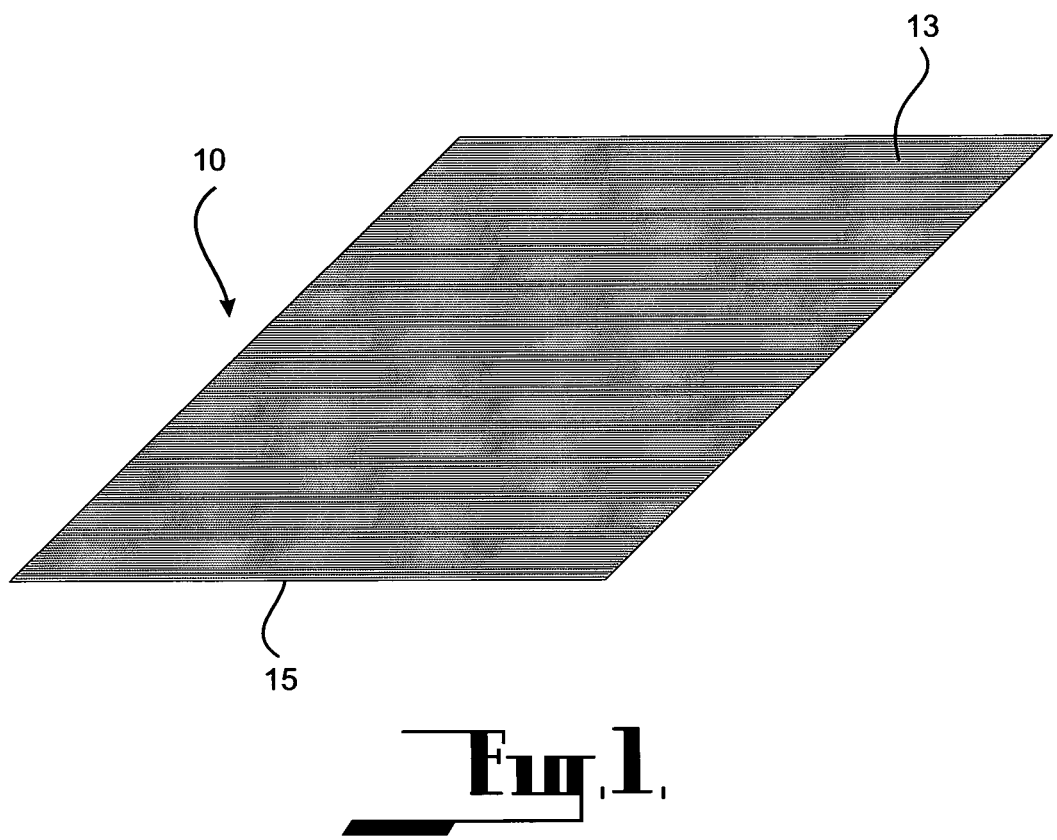
FIG. 1 is perspective view of a composite barrier according to a first embodiment.

Referring now to FIGS. 1, 2 and 3, there is shown a composite termite barrier 10 comprising a mesh sheet 13 and a membrane 15 affixed to one side of the mesh sheet by being bonded thereto. In effect, the membrane 15 is laminated onto the side of the mesh sheet 13. Typically, the peripheral edge of the membrane 15 aligns with the peripheral edge of the mesh sheet 13 such that the membrane covers the entire side of the mesh sheet to which it is bonded.

In this embodiment the mesh sheet 13 comprises metal mesh, typically stainless steel mesh. Other forms of mesh can, of course, be used, including plastic mesh.

The membrane 15 comprises a sheet of flexible plastics material such as polyethylene or polypropylene. The membrane 15 is impregnated with a termite resisting product such as a termiticide. The termiticide may be of any appropriate form such as, for example, deltamethrin, bifenthrin, permethrin or an effective natural plant extract. Other effective termiticides may, of course, also be used. Further, the termite resisting product need not necessarily be a termiticide; it may, for example, be a product which acts to repel termites upon approaching and/or contacting the barrier.

While not shown in the accompanying illustrations, the membrane 15 may have pores through which air and moisture can pass for ventilation and drainage, if desired.

In the prior art termite barriers described and illustrated in the aforementioned installations described and illustrated in Australian Patents 639256 and 696436, the termite barrier material comprised a mesh sheet of a material resistant to breakdown in the environment of use and substantially resistant to termite secretions and has a hardness of not less than about Shore D70, the pores of said mesh having a linear dimension in any direction less than the maximum linear dimension of the cross section of the head of the species of termite to be controlled.

In this embodiment, a less robust mesh material can be utilised as the mesh sheet 13. Indeed, it is not necessary that the mesh material be resistant to termite secretions and have pores of a size through which the termites to be controlled cannot pass. The reason for this being unnecessary arises because of the effect of the membrane 15. More particularly, the presence of the termiticide in the membrane 15 deters termites from approaching the composite barrier 10, and thus it is not essential that the mesh sheet 13 be sufficiently robust to in itself resist the passage of termites. Similarly, it is not essential that the mesh have a pore size sufficiently small to prevent the passage of termites being controlled therethrough. In other words, the mesh sheet 13 does not necessarily provide a physical barrier in itself but functions in conjunction with the termiticide in the membrane to deter the passage of termites. The deterrent effect is attained through repelling termites approaching the composite termite barrier 10 or alternatively killing termites contacting the composite termite barrier.

The mesh sheet 13 provides a support structure for the flexible membrane 15. The mesh sheet 13 has some inherent lateral rigidity, and thus its presence in the termite barrier 10 allows the barrier to be formed into configurations that can be maintained. For example, folds and creases can be formed in the termite barrier 10 should they be required for a particular installation.

Because the mesh sheet 13 does not need in itself to be capable of resisting the passage of termites, mesh material of a cost-effective alloy specification (or similar) can be used and thus a more cost-effective termite barrier provided. Further, the termite barrier 10 may be of lower mass owing to the reduced metal content.

The membrane 15 may be coloured for identification purposes. Indeed, termite barriers 10 according to the embodiment may be provided with membranes 15 in a variety of colours.

While not shown in the drawings, a protective membrane may also be applied to the mesh sheet 13. The protective membrane may be provided for the purpose of allowing a person handling the composite pest barrier 10 to avoid contact with the pest deterrent. The protective membrane would serve to shield the person handling the composite pest barrier from direct contact with the pest deterrent and accordingly would typically not incorporate any pest deterrent, or at least any pest deterrent present would be at a level deemed to be safe for handling purposes.

Figure 4:
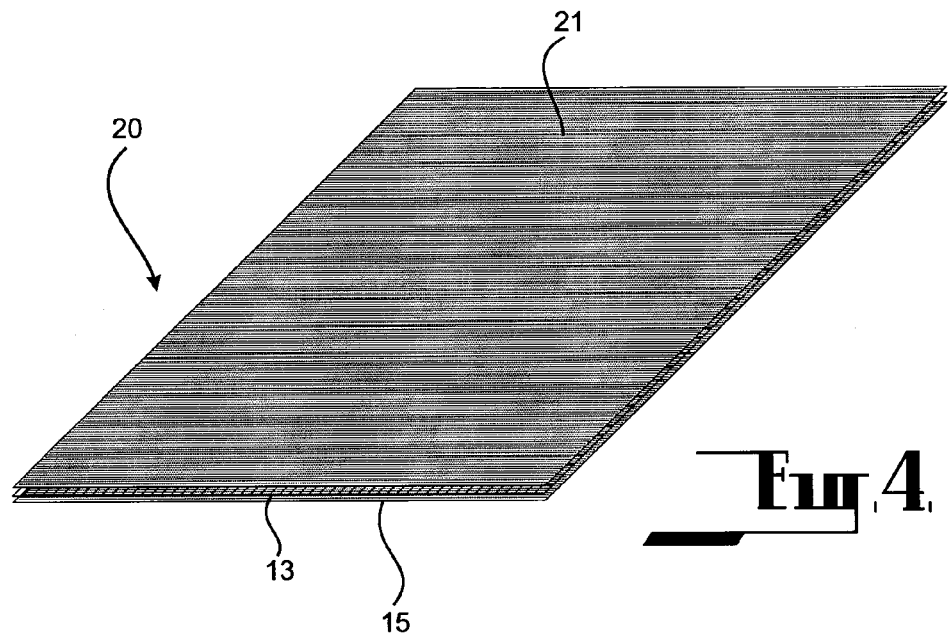
FIG. 4 is perspective view of a composite barrier according to a second embodiment.
Figure 5:
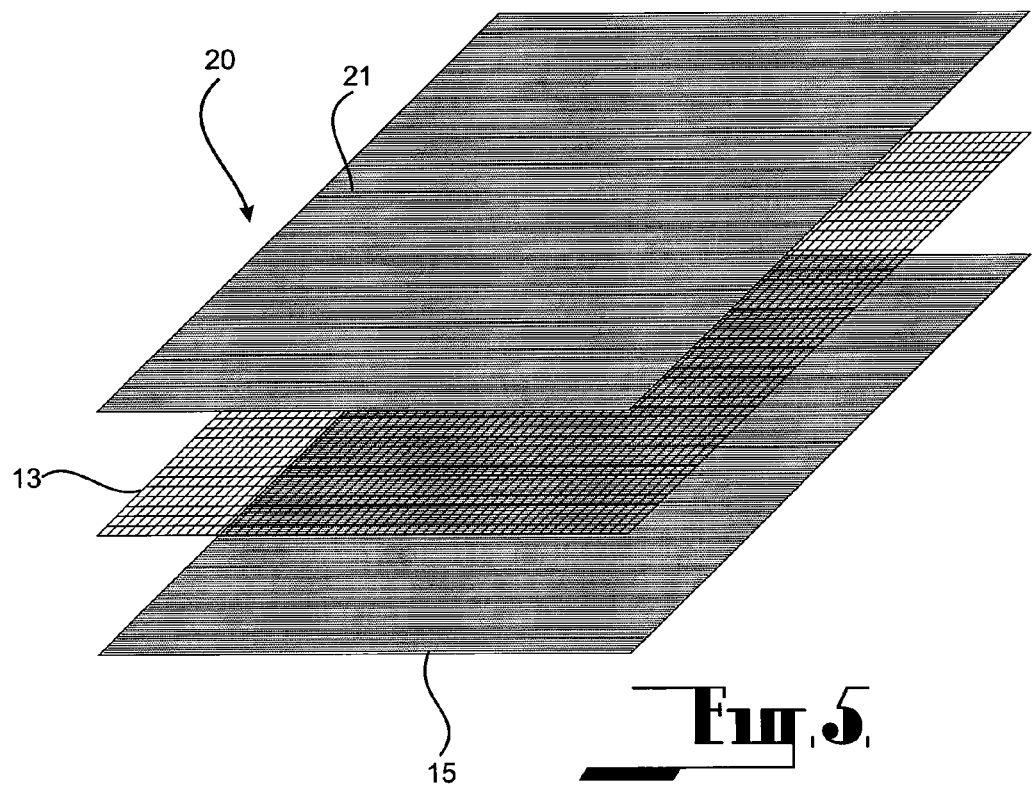
FIG. 5 is an exploded perspective view of the composite barrier according to a second embodiment.

Referring now to FIGS. 4 and 5, the termite barrier 20 according to the second embodiment is similar to the first embodiment, and so corresponding reference numerals are used to identify corresponding parts. This second embodiment includes a further membrane 21 affixed to the other side of the mesh sheet 13. In this embodiment, the further membrane 21 is typically of the same construction as the membrane 15 and is impregnated with a termite resisting product such as a termiticide. Alternatively, the further membrane 21 may comprise a protective membrane serving to shield a person handling the composite pest barrier 20 from direct contact with the pest deterrent.

Figure 6:
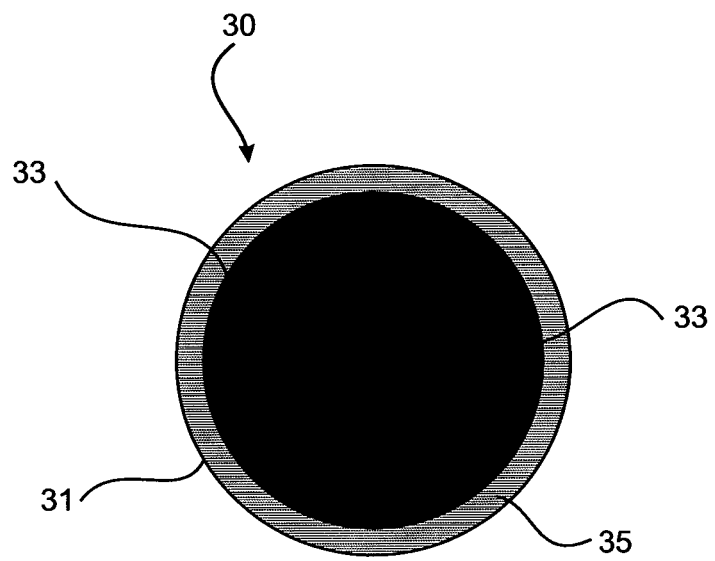
FIG. 6 is fragmentary perspective view of a composite barrier according to a third embodiment.

Referring now to FIGS. 6, a composite termite barrier 30 according to a third embodiment comprises a mesh sheet 31 having a plurality of woven wire strands 33, only one of which is illustrated. Each strand 33 has a coating 35 impregnated with a termite resisting product such as a termiticide. The coating 35 is in the form of a relatively thin skin on the strand 33. The coating 35 may be of any appropriate form including a metallic coating.

The coating 35 may allow use of a cost-effective alloy specification or similar material for the mesh sheet 31 while affording the necessary corrosion resistance.

Figure 7:
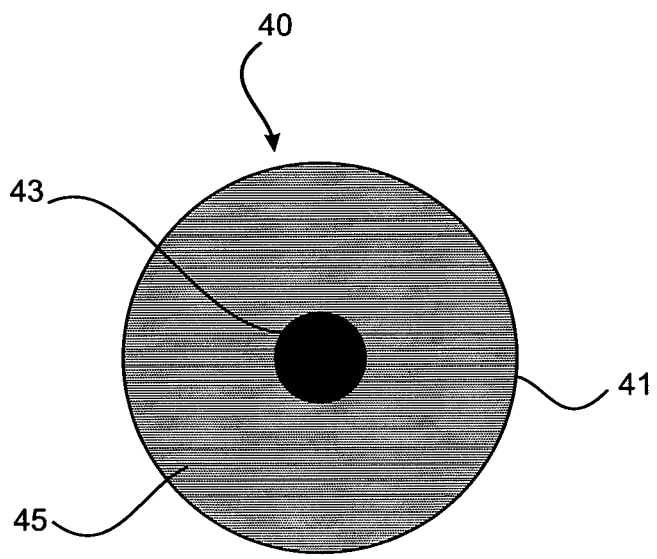
FIG. 7 is fragmentary perspective view of a composite barrier according to a fourth embodiment.

Referring now to FIG. 7, a composite termite barrier 40 according to a fourth embodiment comprises a mesh sheet 41 having a plurality of woven wire strands 43, only one of which is illustrated. Each strand 43 has a coating 45 impregnated with a termite resisting product such as a termiticide. In this embodiment, each strand 43 comprises a relatively thin metal wire and the coating 45 is relatively thick in comparison to the diameter of the strand, as illustrated. In this embodiment the coating 45 is a plastic coating. The coating may, of course, be of any other suitable material such as a foam material.

In the third and fourth embodiments, the coatings may be coloured for identification purposes.

Figure 8:
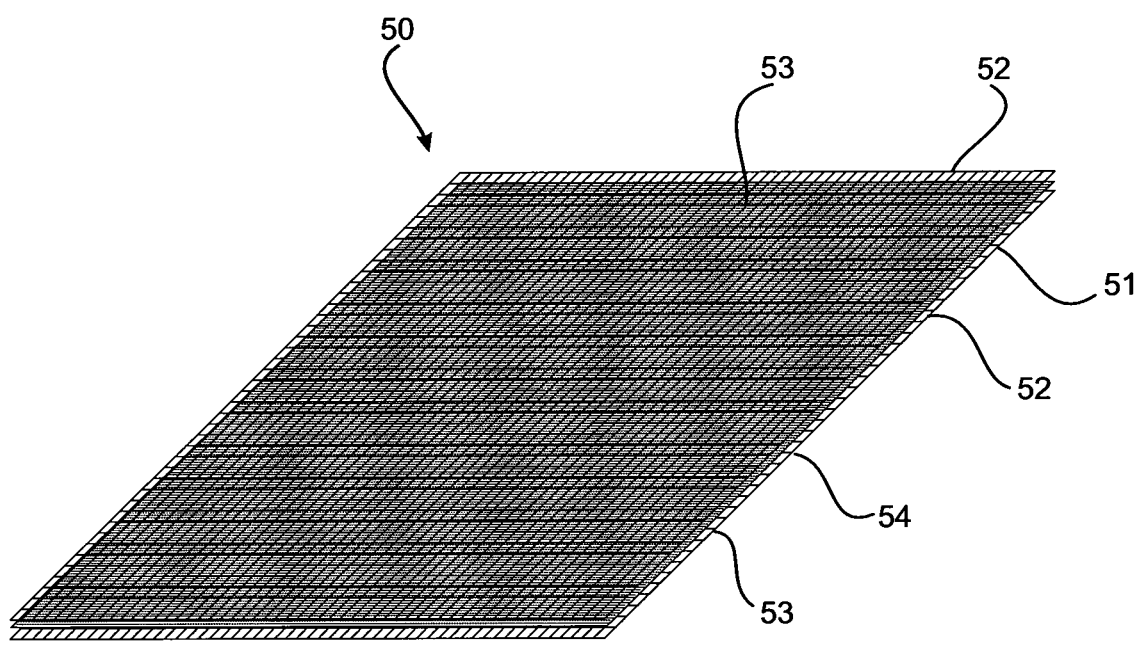
FIG. 8 is perspective view of a composite barrier according to a fifth embodiment.
Figure 9:
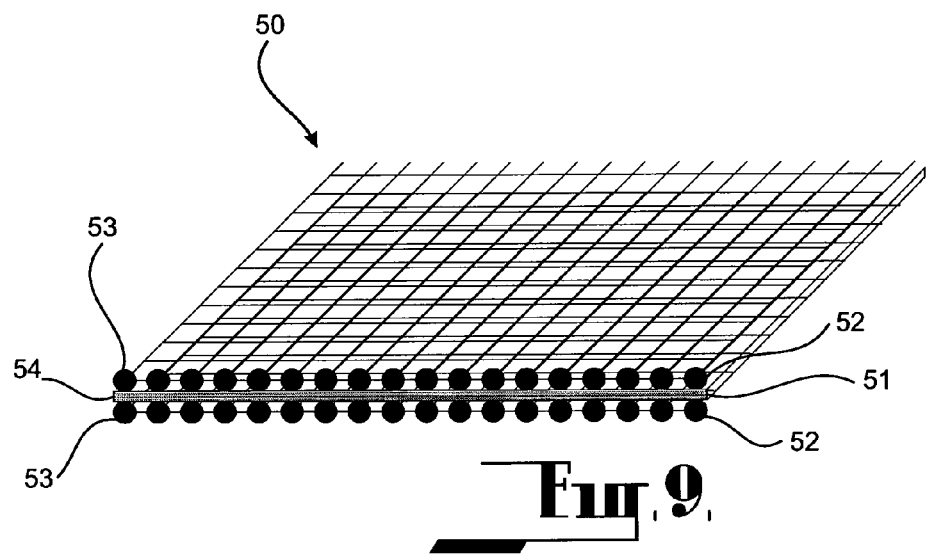
FIG. 9 is fragmentary schematic perspective view, on an enlarged scale, of the composite barrier according to the fifth embodiment.
Figure 10:
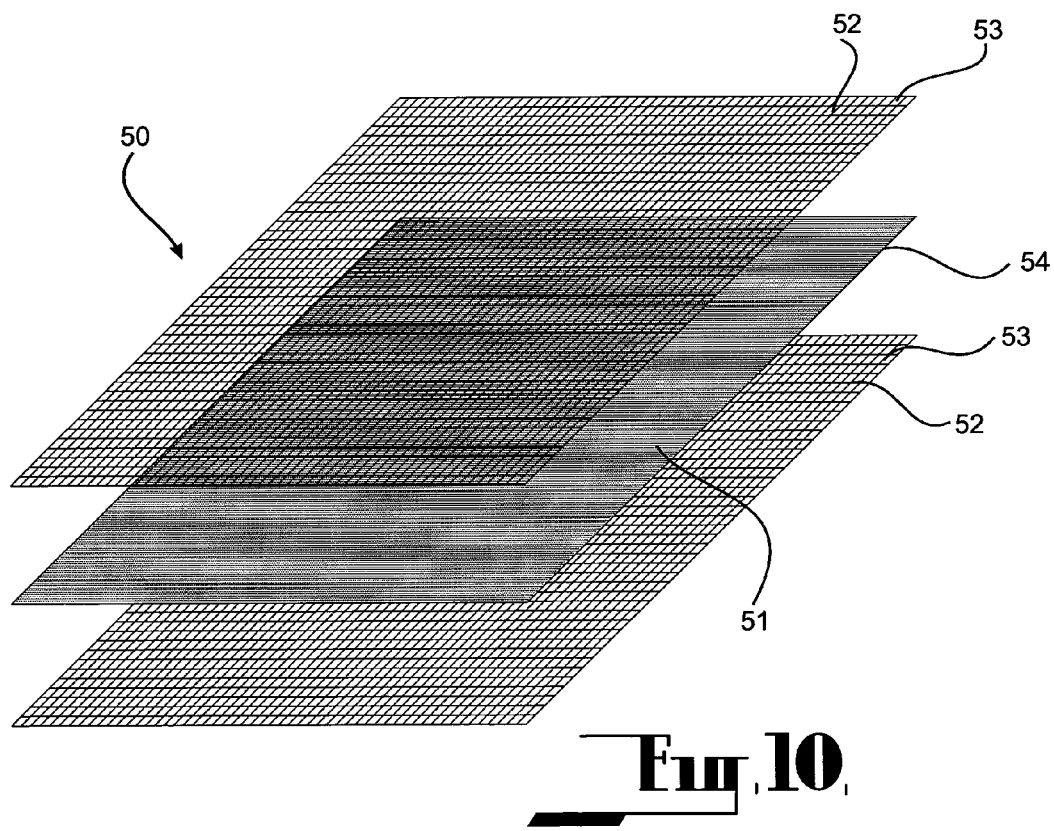
FIG. 10 is an exploded perspective view of the composite barrier according to the fifth embodiment.

Referring now to FIGS. 8, 9 and 10, there is shown a composite termite barrier 50 according to a fifth embodiment comprising a pest deterrent 51 interposed between two mesh sheets 52. The composite termite barrier 50 is of a laminated construction in which the two mesh sheets 52 comprise outer layers 53 and in which an inner layer 54 is interposed between the two outer layers. The inner layer 54 comprises a layer impregnated with a termite resisting product such as a termiticide to provide the pest deterrent 51. The inner layer 54 may comprise a membrane in the form of a fibre blanket.

Where appropriate, the composite termite barriers according to the third, fourth and fifth embodiments may incorporate a protective membrane as was described in relation to the first and second embodiments. The protective membrane would serve to shield a person handling the composite pest barrier from direct contact with the pest deterrent.

From the foregoing, it is evident that the various embodiments provide a composite termite barrier involving a mesh structure and a chemical deterrent to termites. The mesh structure does not necessarily provide a physical barrier alone but functions in conjunction with the chemical to deter the passage of termites. The deterrent effect is attained through repelling termites approaching the barrier or alternatively killing termites contacting the barrier or a combination of both repelling and killing termites.

The combination of the mesh structure and the chemical provides an effective barrier which may have certain advantages over both physical barriers alone and chemical barriers alone. For example, the composite barrier can be more cost-effective than a stainless steel mesh barrier as a result of the use of inexpensive materials. Further, the composite barrier, while using a chemical product (such as a pesticide) as part of its construction, does not require delivery of the chemical product at the location where pest control is required by way of unsafe delivery processes such as spraying, pouring or injection.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The claim defining the invention is as follows:

1. A composite pest barrier comprising mesh sheeting and a membrane applied to one side of the mesh sheeting whereby the mesh sheeting supports the membrane, wherein the membrane carries a pest deterrent, and a further membrane applied to the other side of the mesh sheeting.

2. The composite termite barrier according to claim 1 wherein the further membrane functions as a protective membrane to shield a person handling the composite pest barrier from direct contact with the pest deterrent.

3. The composite termite barrier according to claim 1 wherein the mesh sheeting provides an outer layer and wherein there is a further outer layer and an inner layer interposed between the two outer layers, the membrane providing the inner layer.

4. The composite barrier according to claim 3 wherein the membrane comprises a fibre blanket.

5. The composite barrier according to claim 3 wherein the further outer layer comprises mesh sheeting.

6. The composite termite barrier according to claim 1 wherein the pest deterrent comprises a composition for repelling termites from approaching and/or contacting the barrier.

7. The composite termite barrier according to claim 1 wherein the pest deterrent comprises a termiticide.

8. The composite termite barrier according to claim 7, wherein the termiticide is selected from the group consisting of: deltamethrin, bifenthrin, permethrin and natural plant extracts.

9. The composite pest barrier according to claim 1 wherein the membrane is impregnated with a pest deterrent material to provide the pest deterrent carried by the membrane.

10. The composite pest barrier according to claim 1 wherein the membrane has a pest deterrent material applied thereto to provide the pest deterrent carried by the membrane.

11. The composite pest barrier according to claim 1 wherein both the membrane and the further membrane carry pest deterrent.

12. The composite pest barrier according to claim 1 wherein the membrane is colored differently than the further membrane to provide a visual distinction between the membrane and the further membrane.

13. The composite pest barrier according to claim 1 wherein the membrane comprises a sheet of flexible plastics material.

14. The composite pest barrier according to claim 1 wherein the membrane and the further membrane each comprise a sheet of flexible plastics material.

15. The composite pest barrier according to claim 1 wherein the mesh sheeting comprises metal mesh.

16. The composite pest barrier according to claim 15 wherein the metal mesh comprises stainless steel mesh.

17. The composite pest barrier according to claim 1 wherein the mesh sheeting has inherent lateral rigidity whereby the composite pest barrier can be formed into configurations that can be maintained.

18. The composite pest barrier according to claim 1 wherein the membrane has pores through which air and moisture can pass for ventilation and drainage.

19. The composite pest barrier according to claim 1 wherein each of the membrane and the further membrane has pores through which air and moisture can pass for ventilation and drainage.

20. The composite pest barrier according to claim 1 wherein the membrane is affixed to the mesh sheeting.

21. The composite pest barrier according to claim 20 wherein the membrane is bonded to the mesh sheeting.

22. The composite pest barrier according to claim 20 wherein the membrane is laminated onto to the mesh sheeting.

23. The composite pest barrier according to claim 1 wherein the peripheral edge of the membrane aligns with the peripheral edge of the mesh sheeting whereby the membrane covers the entire side of the mesh sheeting to which it is applied.

24. The composite pest barrier according to claim 1 wherein the further membrane is affixed to the mesh sheeting.

25. The composite pest barrier according to claim 24 wherein the further membrane is bonded to the mesh sheeting.

26. The composite pest barrier according to claim 25 wherein the further membrane is laminated onto to the mesh sheeting.

27. The composite pest barrier according to claim 1 wherein the peripheral edge of the further membrane aligns with the peripheral edge of the mesh sheeting whereby the membrane covers the entire side of the mesh sheeting to which it is applied.

* * * * *